A. E. MICKELSON.
HORSESHOE.
APPLICATION FILED JUNE 14, 1919.
1,343,874. Patented June 15, 1920.
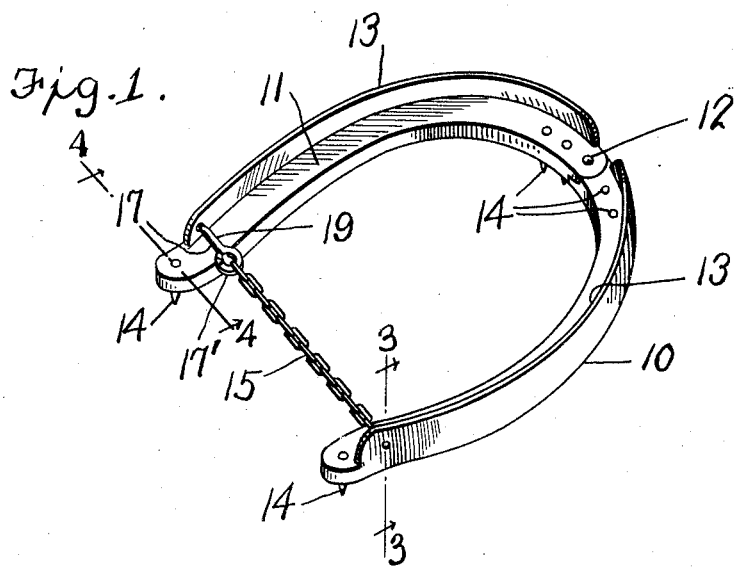
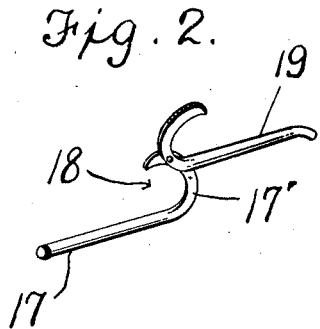
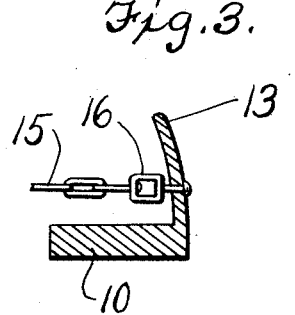
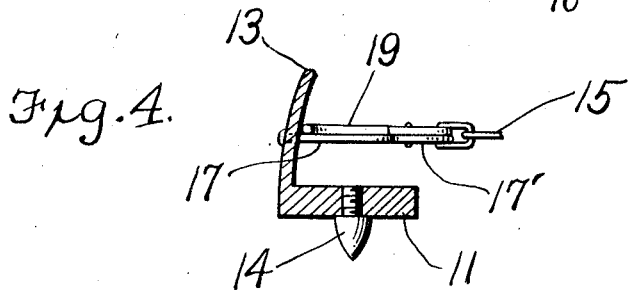
Witnesses
L. B. James
Inventor
A. E. Mickelson
By Victor J. Evans
Attorney

UNITED STATES PATENT OFFICE.

ALGOT EBINHART MICKELSON, OF DEVLIN, ONTARIO, CANADA.

HORSESHOE.

1,343,874. Specification of Letters Patent. Patented June 15, 1920.

Application filed June 14, 1919. Serial No. 304,349.

*To all whom it may concern:*

Be it known that I, ALGOT E. MICKELSON, a citizen of the United States, residing at Devlin, in the Province of Ontario and Dominion of Canada, have invented new and useful Improvements in Horseshoes, of which the following is a specification.

This invention relates to horseshoes, and has for its object the provision of a shoe susceptible of adjustment to various sizes and one which can be applied to the hoof without the use of nails or analogous fastening elements.

To this end the invention embodies a pair of pivotally connected shoe sections, and a lever carried by one section for engagement with a chain carried by the other section, in a manner whereby said sections may be fixed relatively on the hoof of the animal.

The nature and advantages of the invention will be better understood when the following detail description is taken in connection with the accompanying drawing, the invention residing in the construction, combination and arrangement of parts as claimed.

In the drawing forming part of the specification like numerals of reference indicate similar parts in the several views and wherein:

Figure 1 is a perspective view constructed in accordance with my invention;

Fig. 2 is a detail sectional view of the fastening means showing the lever in its extended or inactive position;

Fig. 3 is a transverse sectional view taken on the line 3—3 of Fig. 1; and

Fig. 4 is a similar view taken on the line 4—4 of Fig. 1.

Referring to the drawing in detail, the shoe embodies the sections 10 and 11 respectively, the adjacent extremities of which are overlapped and pivoted as at 12. Each section is provided with a flange 13 adapted to embrace the hoof of the animal, while the toe and heel calks 14 are threadedly secured to the respective sections of the shoe, so that they can be readily removed when desired.

For the purpose of securing the sections together, and holding the shoe upon the hoof of an animal without the use of a nail or analogous fastening element, I make use of a chain 15 which is secured to the section 10 by means of a swivel 16 carried by the flange of said section. Projecting from the flange of the section 11 is a short rod 17 having one end terminating in a hook-like portion 17'. Pivoted as at 18 is the curved extremity of a lever 19, which when swung to the position illustrated in Fig. 1 serves to hold the chain fixed to the hook-like portion of the rod 17. The swivel connection between the chain and the section 10 of the shoe manifestly prevents twisting of the chain. The sections 10 and 11 may be swung upon their pivot to any desired position, to accommodate different sized hoofs, and when it is desired to fasten the shoe upon the hoof the lever 19 is passed through one of the links of the chain. For this purpose the lever is swung to the position disclosed in Fig. 2. As the lever is moved to its final or adjusted position by swinging the part 19 over to the left, the link through which the lever is passed is guided into a position where it engages the hook-like terminal of the rod 17. The shoe can be readily removed from the hoofs when desired by swinging the lever from the position disclosed in Fig. 1 to that indicated in Fig. 2.

While I have shown and described what I consider the preferred embodiment of the invention I desire to have it understood that I do not limit myself in this connection, inasmuch as such changes may be resorted to when desired as fall within the scope of what is claimed.

Having thus described my invention I claim:

1. A horseshoe comprising a pair of pivotally connected sections, a hook-like element carried by one section, a chain associated with the other section, and a lever pivoted on said element adapted to be passed through a link in said chain to hold the latter engaged with said element.

2. A horseshoe comprising a pair of pivotally connected sections, a hook-like element projecting from one section, a chain, a swivel connection between the chain and the other of said sections of the shoe, and a lever pivoted upon said element and adapted to be passed through a link in the chain to hold the latter engaged with said element as described.

In testimony whereof I affix my signature.

ALGOT EBINHART MICKELSON.